Feb. 28, 1961  W. B. STEIN  2,972,802
MILLING CUTTER WITH ADJUSTABLE RADIAL RAKE
Filed Oct. 10, 1957  2 Sheets-Sheet 1

INVENTOR.
WILLIAM B. STEIN

BY
*J. William Freeman*

ATTORNEY

Feb. 28, 1961 W. B. STEIN 2,972,802
MILLING CUTTER WITH ADJUSTABLE RADIAL RAKE
Filed Oct. 10, 1957 2 Sheets-Sheet 2

INVENTOR.
WILLIAM B. STEIN
BY
ATTORNEY

United States Patent Office 2,972,802
Patented Feb. 28, 1961

2,972,802

MILLING CUTTER WITH ADJUSTABLE RADIAL RAKE

William B. Stein, 619½ Tuscarawas Ave., Barberton, Ohio

Filed Oct. 10, 1957, Ser. No. 689,408

9 Claims. (Cl. 29—105)

This invention relates to the art of milling machine cutters and in particular has reference to improvements in face mill type of cutters wherein the radial rake angle of the cutting member can be varied.

In general, face mills of the category above-described include a revolving cylindrical body having a plurality of cutting bits carried adjacent the peripheral edge surface thereof and projecting therebeyond so that upon rotation of the cylindrical body about its axis of rotation, the radially spaced teeth will progressively engage the work object so as to effectuate a cutting of the surface thereof.

Milling cutters of this general type have long been known in the prior art, with the usual milling cutter including a plurality of tool bits received in axially extending slots that extend inwardly from the peripheral edge surface thereof. Various means and devices have been employed to releasably clamp the cutting bits in place in these slots.

While a milling cutter of this general prior art description operates satisfactorily in several instances, it has often been found desirous to vary the radial rake angle of the cutting bits for various purposes. In general, the desire for such a change in radial rake angle would result from the use of different types of material of varying hardness.

In the past, when it was necessary to change the radial rake angle of the cutting tool, it was necessary that the individual bits be removed from the slots in which the same were received and upon removal, the same were ground so that the cutting edge thereof, when reset in the cutting tool, would be disposed at a different radial rake angle. A user, of course, had the option to have additional cutters with different rake angles on hand.

It is believed apparent that such a method of changing the radial rake angle is at best cumbersome, time consuming, and highly expensive. Also, it is believed important to note that inaccuracy in the above-described re-grinding operation will inadvertently occur with the result that unequal cutting force will be absorbed by certain of the milling cutters, with the result that those cutters that are subjected to such abnormal wear will be prematurely dulled to thus decrease the usable period of the cutting tool.

As a still further disadvantage of the known prior art, it has been found that the individual bits are subjected to considerable axial thrust during the cutting operation with the result that axial shifting of the cutting tool frequently occurs within the slot receiving the same. It is of course axiomatic that such shifting will render such tool bit ineffective, with the result that the load that should be absorbed thereby will be transferred to an adjacent bit to prematurely dull the same.

It has been found that the above disadvantages of the known prior art can be obviated by providing a cutting tool of this general type wherein the bits can be arcuately rotated about a longitudinal axis thereof while the same are positioned in the usual axially extending slot. It has been further found that if the slot and the cutting tool are provided with complemental arcuate surfaces, that this relative rotation of movement of the bit can easily occur, with the result that the angular disposition of the cutting edge can be varied about the axis of rotation of the cutter so as to adjust the radial rake thereof.

It has still further been found that if the point contact between the bit and the groove receiving the same is defined by axially extending serrations that rotational movement of the bit will be positively prevented during operation as a result of mechanical interlock between the bit and the cylindrical body.

As a still further discovery in this regard, it has been found that axial shifting of the bit can be obviated by providing a releasable mechanical interlock between the bit and the body with the result that all shifting of the bit will be obviated when the interlocking mechanism is in operation.

It accordingly becomes the principal object of this invention to provide a milling cutter having plurality of cutting bits arranged in a circular course around the axis of rotation and being characterized by the fact that the radial rake of the cutting edges of the individual bits can be accurately adjusted and preset in uniformity.

It is a still further object of this invention to provide a milling cutter having the cutter bits thereof adjustable as to their rake angle and being further characterized by the presence of a mechanical interlock between the bit and the cutter body which obviates any shifting movement thereof during the cutting operation.

It is a still further object of this invention to provide a cutting tool of the general character above-described that is simple in operation, and which will maintain an accurate cutting condition during usage thereof.

These and other objects of the invention will become more apparent upon a reading of the following brief specification, considered and interpreted in the light of the accompanying drawings.

Of the drawings:

Figure 1 is a perspective view of an improved milling cutter embodying the features of the invention.

Figures 2 and 3 are sectional views taken on the lines 2—2, and 3—3, of Figure 1.

Figure 1:
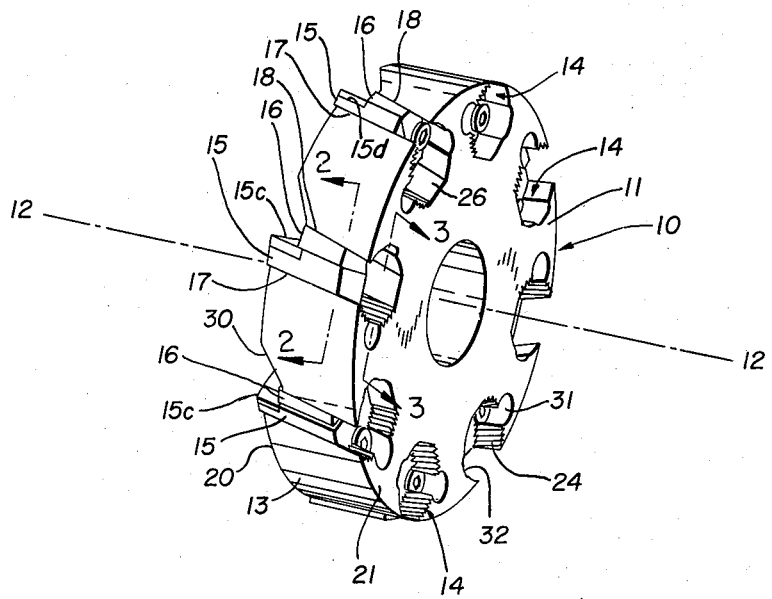

Referring now to the drawings and in particular to Figures 1 through 4 thereof, the improved cutting tool, generally designated by the numeral 10, is shown including a cylindrical body 11 having an axis of rotation 12—12, and a peripheral surface 13. The peripheral surface 13, is shown provided with a plurality of generally axially extending slots that are generally designated by the numeral 14, 14, with each such slot 14 receiving a cutting element including a shank 15, having a cutting bit insert 15d, and a wedge member 16, and with the width of the opening of the individual slots 14, 14, in each case being defined by edge portions 17 and 18 that preferably are inclined with respect to each other so as to be convergent in nature and thus provide a tapering opening as is clearly shown in Figure 1 of the drawings.

Figure 3:
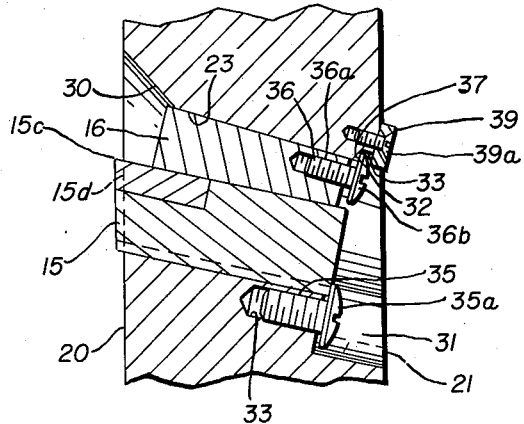
Figure 4:
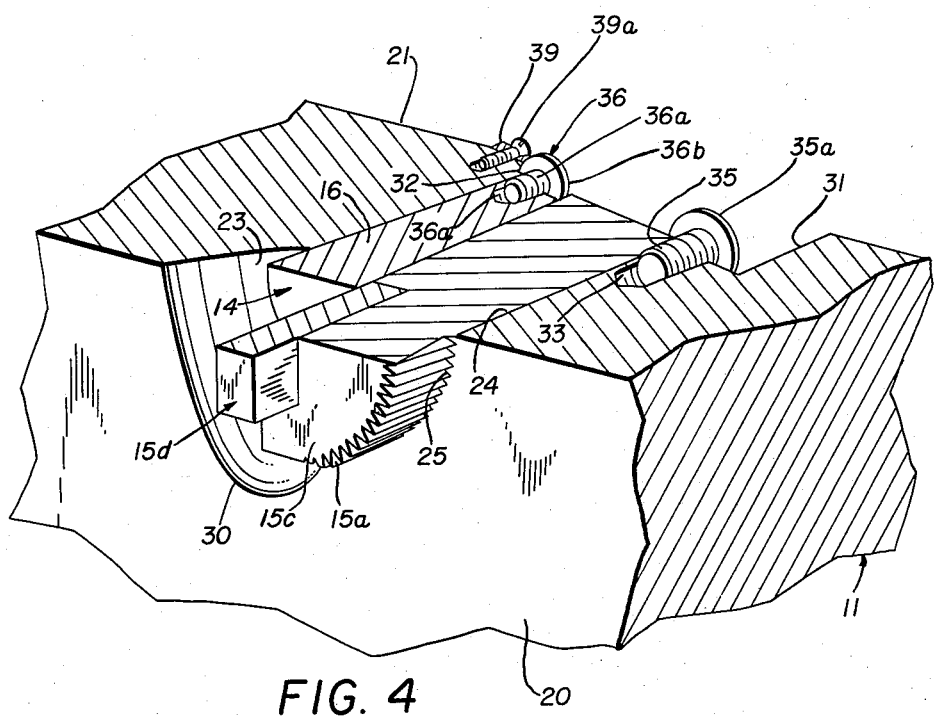
Figure 4 is an enlarged perspective view showing the position of the cutting bit from a frontal view.
Figure 5:
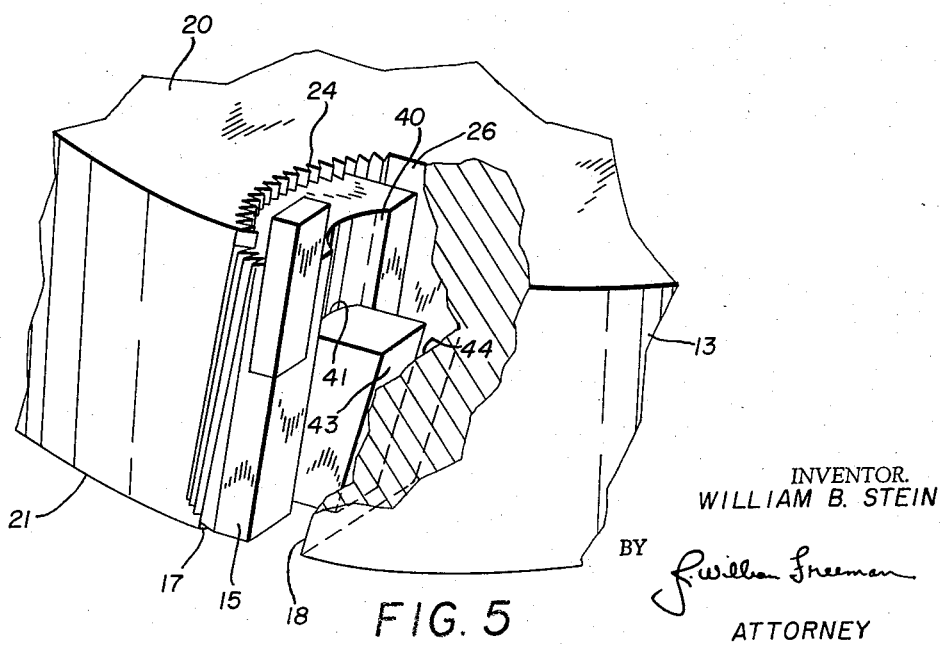
Figure 5 is a perspective view of a modified form of the invention.

Turning now to a detailed consideration of the individual slot members 14, 14, it will first be assumed that the cyindrical body member 11 has front and rear face surfaces 20 and 21 respectively, with the cutting edge 15c of each cutting bit projecting beyond the front face 20 as shown in Figures 3 and 4 of the drawing. In Figures 4 and 5, the insert 15d is shown projecting slightly beyond the end of the shank 15, and it is to be understood that the degree of such projection is at the option of the user.

Figure 2:
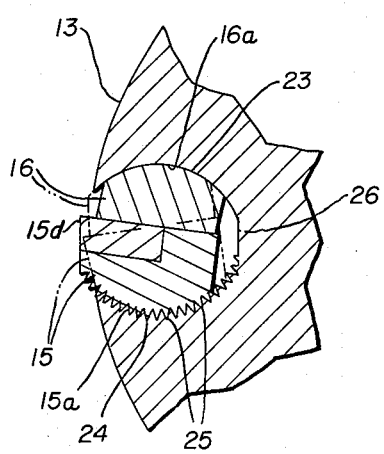

In the preferred embodiment of the invention, each slot has a substantial axial length thereof defined by arcuate surface segments 23 and 24 with the arcuate surface segment 23 being intended to complementally engage a correspondingly contoured surface 16a that is provided on the wedge member 16 as shown best in Figure 2 of the drawings. Similarly, the arcuate surface 24 has provided thereon a series of contiguous, axially extending, serrations 25, 25 with these serrations complementally engaging, as shown in Figure 3, correspondingly contoured serrations 15a, 15a, that are provided on one face surface of the cutting bit 15. Also, as shown in Figure 2, a flat surface 26 preferably interconnects the arcuate surfaces 23 and 24 in the radially innermost portion of the slot 14 so as to provide clearance for adjusting between the full and chain dotted line positions of Figure 2.

In addition to the aforementioned component parts, the contour of the slot 14 is further effected by cut-outs 30, 30 that extend axially inwardly from the front face 20 so as to provide a chip clearance area for chips removed by cutting members 15, 15 during rotation of the cutting tool. Additionally, and for the purpose of securing the individual members 15 and 16 against axial movement when the same are received in the slots 14, 14, the rear face 21 is shown provided with a plurality of counter bores 31 and 32 with each counterbore 31 extending arcuately from the serrated surface 24 while the individual counterbores 32, 32 extend arcuately from the surface 23 as is best shown in Figures 1 and 3 of the drawings.

Receivable in a tapped aperture 33 of each counterbore 31 is a screw member 35 that is movable axially of the bore 33 so as to have its head portion 35a overhang the rearmost end portion 15b of the individual bits 15, 15, as is clearly shown in Figure 3 of the drawings.

Similarly, the individual wedge members 16, 16 are preferably provided with a threaded bore 36a within which may be received a screw member 36; the arrangement being such that head 36b thereof may overhang a shoulder portion 37 that is defined by the counterbore 32 and arcuate wall surface 33. In this manner, the axial projection of the cutting edge 15c beyond the surface 20 may be determined by the setting of the screw 35 while the clock-wise movement of the screw 36 will cause the wedge member 16 to be drawn into wedging relationship between arcuate wall 23 and bit 15 as is clearly shown in Figure 3 of the drawings. In this regard, the preferred embodiment of the invention contemplates the provision of a lug 39, detachably secured by screw 39a to rear face 21 so as to create a slot arrangement within which the head may be received. In this manner, rotation of the screw head 36 will propel or repel the wedge 16 axially in slot 14.

Preferably, in use or operation of the improved device, it will first be assumed that the component parts have been assembled as indicated in full lines in Figure 2 of the drawings. In the event that it is desired to adjust the angular disposition of the cutting bit to the position shown in chain dotted lines in Figure 2 of the drawings, it is merely necessary that the screw member 36 be backed off and that the wedge member be shifted to the left of Figure 3. This movement to the left of the wedge member 16 will free the bit member 15 with the result that the same can be moved upwardly of Figure 3 and then rotated until the desired radial rake angle has been obtained, at which time the wedge member 16 can be reset by merely imparting clock-wise rotational movement to the screw member 36 so as to cause the same to draw the wedge 16 into the position of Figure 3. In the event that any tool needs to be replaced, it is merely necessary that the above sequence of operation be employed and upon repositioning of the tool, the same can be adjusted to have the proper projection beyond the surface 20 by merely adjusting the screw member 35 in a manner believed to be obvious.

In the modified form of the invention shown in Figure 5 of the drawings, a similar adjusting of radial rake is contemplated and accordingly, where indicated, like numerals designate like parts.

Accordingly, each wedge member 15 is shown additionally including an arcuate concave surface 40 that is preferably concentric to the previously described surface 24 so that the edge portions 40 and 24 are parallel in their nature.

As shown in Figure 5 of this arcuate surface 40 is received against a concentric, similarly contoured convex surface 41 that is provided on the member 16. This accordingly presents an arcuate space between the surface 41 and the surface 24, with this space being filled by the member 15 as is shown in Figure 5. It is of course apparent that the surfaces 40 and 41 could be convex and concave respectively, if desired, provided that the same were concentric. Also a spherical or other appropriately contoured filler could be utilized as a swivel bearing between these surfaces 40 and 41.

Because the cutting bit 15 will rotate around wedge member 16 as just-described, the previously described surface 23 may in this case be replaced by a surface 44 that is preferably made flat throughout its extent so as to complementally engage an equivalent surface 43 that is provided on the wedge member 16. As before, however, the edge surface 18 will preferably taper throughout its axial extent with respect to the axis of rotation with the result that the above-described wedging action can occur.

Operation of the modified form of the invention is as before, with upward (Figure 5) movement of the wedge 16 permitting rotation of the member 15 to a new position of arcuate disposition. Similarly, upon repositioning of the wedge, it is apparent that the interlock between serrations 25 and 15a will prevent further rotational movement.

It is to be understood also that other types of locking means such as set screws, expanding wedges and the like could be employed with equivalent results and that slots 14, 14 need not taper.

While a full and complete description of the invention has been set forth in accordance with the dictates of the patent statutes, it is to be understood that the invention is not intended to be so limited.

Accordingly, modification of the invention may be resorted to without departing from the spirit hereof or the scope of the appended claims.

What is claimed is:

1. A milling cutter of the character described, comprising; a tool body having an axis of rotation and a front face that is substantially normal to said axis of rotation; at least one elongate slot extending inwardly of said body from said front face at a radial distance from said axis of rotation of said body and including opposed and longitudinally extending bit receiving and wedge receiving surfaces; a series of serrations extending longitudinally of said bit receiving surface of said slot in parallelism with each other; an elongate bit member receivable in said slot and having a cutting edge projecting beyond said front face; said bit having opposed slot engaging and wedge engaging surfaces that extend longitudinally thereof; a second series of serrations extending longitudinally of said slot engaging surface of said bit member in parallelism with each other and being complemental to said first series of serrations; and an elongate wedge member receivable in said slot for seating between said wedge engaging surfaces of said slot and said bit member with said wedge member urging said first and second series of serrations into mesh upon seating of said wedge in said slot; said second series of serrations being indexable relatively of said first series upon unseating of said wedge member.

2. The device of claim 1 further characterized by the fact that said bit receiving surface of said slot and said slot engaging surface of said bit member are of complemental arcuate cross sectional configuration, whereby said bit member may rotate around its longitudinal axis in said slot upon unseating of said wedge member.

3. The device of claim 1 further characterized by the fact that said bit and said wedge member may be rotated as a unit around a longitudinal axis of said slot upon unseating of said wedge member.

4. The device of claim 1 further characterized by the fact that said bit engaging and wedge engaging surfaces of said slot are respectively concentric to the slot engaging surfaces of said bit member and said wedge member.

5. The device of claim 1 further characterized by the fact that said bit member may be longitudinally rotated relatively of said slot and said wedge member upon unseating of said wedge member.

6. The device of claim 1 further characterized by the fact that said wedge and said bit member are provided with complemental arcuate surfaces at their point of contact; said surfaces being concentric to said bit engaging surface of said slot, whereby said bit may longitudinally rotate relatively of said slot and said wedge member upon unseating of said wedge member.

7. A milling cutter of the character described, comprising; a tool body having an axis of rotation and a front face that is substantially normal to said axis of rotation; at least one elongate slot extending inwardly of said body from said front face at a radial distance from said axis of rotation of said body and including opposed and longitudinally extending bit receiving and wedge receiving surfaces; a series of serrations extending longitudinally of said bit receiving surface of said slot in parallelism with each other; an elongate bit member receivable in said slot and having a cutting edge projecting beyond said front face; said bit having opposed slot engaging and wedge engaging surfaces that extend longitudinally thereof; a second series of serrations extending longitudinally of said slot engaging surface of said bit member in parallelism with each other and being complemental to said first series of serrations; an elongate wedge member receivable in said slot for seating between said wedge engaging surfaces of said slot and said bit member with said wedge member urging said first and second series of serrations into mesh upon seating of said wedge in said slot; said second series of serrations being indexable relatively of said first series upon unseating of said wedge member; and means rotatably carried by said body and mechanically reciprocating said wedge in said slot upon rotation thereof; whereby said wedge may be shifted into and out of seating engagement with said bit member upon rotation of said means.

8. A milling cutter of the character described, comprising; a tool body having an axis of rotation and front and rear faces that are substantially normal to said axis of rotation at least one elongate slot extending rearwardly from said front face at a radial distance from said axis of rotation; an elongate bit member received axially in said slot and having a cutting edge projecting beyond said front face; an elongate wedge member also received in said slot; and means rotatably carried by said body and mechanically reciprocating said wedge in said slot upon rotation thereof, whereby said wedge may be shifted into and out of seating engagement with said bit member upon rotation of said means.

9. The device of claim 8 further characterized by the presence of adjustment means rotatably carried by said body and shifting said bit member forwardly of said slot upon rotation thereof.

References Cited in the file of this patent

UNITED STATES PATENTS

| | | |
|---|---|---|
| 700,736 | Cadel | May 27, 1902 |
| 1,311,452 | Lovejoy | July 29, 1919 |
| 1,348,279 | Heywood | Aug. 3, 1920 |
| 1,366,640 | Dover | Jan. 25, 1921 |
| 1,405,903 | Diller | Feb. 7, 1922 |
| 1,537,957 | Marshall | May 17, 1925 |
| 1,615,969 | West | Feb. 1, 1927 |
| 1,689,474 | Brown | Oct. 30, 1928 |
| 1,948,648 | Buchmuller | Feb. 27, 1934 |
| 2,415,136 | Jerome | Feb. 4, 1947 |
| 2,458,946 | Johnston | Jan. 11, 1949 |
| 2,541,719 | Proksa | Feb. 13, 1951 |
| 2,586,955 | Kaiser | Feb. 26, 1952 |
| 2,751,663 | Leuzinger | June 26, 1956 |